(12) United States Patent
Spesser et al.

(10) Patent No.: US 11,173,800 B2
(45) Date of Patent: Nov. 16, 2021

(54) METHOD FOR CONTROLLING A VEHICLE EXTERNAL CHARGING DEVICE AND, CHARGING DEVICE

(71) Applicant: Dr. Ing. h.c. F. Porsche Aktiengesellschaft, Stuttgart (DE)

(72) Inventors: Daniel Spesser, Illingen (DE); Tim Pfizenmaier, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 216 days.

(21) Appl. No.: 16/556,392

(22) Filed: Aug. 30, 2019

(65) Prior Publication Data

US 2020/0070677 A1 Mar. 5, 2020

(30) Foreign Application Priority Data

Aug. 31, 2018 (DE) .......................... 102018121320.4

(51) Int. Cl.
| | |
|---|---|
| *B60L 53/62* | (2019.01) |
| *B60L 55/00* | (2019.01) |
| *B60L 53/10* | (2019.01) |
| *B60L 53/14* | (2019.01) |

(52) U.S. Cl.
CPC ................ *B60L 53/62* (2019.02); *B60L 53/11* (2019.02); *B60L 53/14* (2019.02); *B60L 55/00* (2019.02)

(58) Field of Classification Search
CPC .......... B60L 53/62; B60L 55/00; B60L 53/11; B60L 53/14; B60L 53/22; B60L 50/50; B60L 50/53; B60L 3/0069; B60L 2270/147; Y02T 90/12; Y02T 90/14; Y02T 10/70; Y02T 10/7072; G01R 19/0092; G01R 27/02; G01R 27/205; G01R 31/00

USPC .......................................................... 320/109
See application file for complete search history.

(56) References Cited

U.S. PATENT DOCUMENTS

| | | | |
|---|---|---|---|
| 8,502,496 B2 | 8/2013 | Hofheinz | |
| 2011/0298466 A1* | 12/2011 | Hein .................... | G01R 19/145 324/508 |
| 2015/0028818 A1* | 1/2015 | Merienne ............. | G01R 27/205 320/137 |

(Continued)

FOREIGN PATENT DOCUMENTS

DE 102010028626 A1 11/2011

*Primary Examiner* — Paul Dinh
(74) *Attorney, Agent, or Firm* — RatnerPrestia

(57) ABSTRACT

A method for controlling a vehicle-external charging device for charging a vehicle. The charging device has an AC current grid having a neutral conductor, a protective conductor and at least one phase conductor, a protection and monitoring apparatus, and a DC current charging terminal. The vehicle includes a high-voltage on-board power system and an electrical energy storage element connected to the on-board power system. The method includes electrically connecting the on-board power system to the DC current charging terminal of the charging device, and detecting a protective conductor resistance between the neutral conductor and the protective conductor by feeding in a test current by way of the protection and monitoring apparatus. A frequency of the test current is either outside of a compensation frequency range of the protection and monitoring apparatus or within the compensation frequency range and is filtered out of the compensation frequency range on a narrowband basis.

9 Claims, 2 Drawing Sheets

(56) References Cited

U.S. PATENT DOCUMENTS

2015/0198644 A1\* 7/2015 Ripoll .................. G01R 27/205
320/109

\* cited by examiner

METHOD FOR CONTROLLING A VEHICLE EXTERNAL CHARGING DEVICE AND, CHARGING DEVICE

CROSS-REFERENCE TO RELATED APPLICATION

This application claims priority to German Patent Application No. DE 10 2018 121 320.4, filed Aug. 31, 2018, which is incorporated by reference herein in its entirety.

FIELD OF THE INVENTION

The invention relates to a method for controlling a vehicle-external charging device for charging a vehicle, in particular an electric or hybrid vehicle. The invention furthermore relates to a vehicle-external charging device for charging such a vehicle.

BACKGROUND OF THE INVENTION

In an electric vehicle or a hybrid vehicle, provision is usually made for an energy storage element, which supplies electrical energy to the electric drive of the vehicle, to be able to be charged by way of a charging device. Such an electrical energy storage element may be designed as an accumulator or as a battery, in particular as a traction battery.

A charging device of the type mentioned at the outset is known from 10 2010 028 626 A1, which is incorporated by reference herein. This charging device comprises an AC current grid having a neutral conductor, a protective conductor and at least one phase conductor, and a rectifier for converting an AC voltage from the AC voltage grid into a DC voltage.

This DC voltage is provided at a DC current charging terminal of the charging device. To ensure that the electric vehicle is protected against a residual current (contact current) to ground in the charging procedure, the charging device comprises a differential current monitoring apparatus that is configured so as to recognize a DC current difference. This differential current monitoring apparatus measures the currents at the DC current charging terminal and is tripped in the event of a residual current to ground in order to interrupt the power supply during charging.

Vehicles having a high-voltage on-board power system and an electrical energy storage element connected to the high-voltage on-board power system are also known. Such high-voltage on-board power systems are normally configured as IT systems, that is to say that no galvanic connection is present between active conductors and grounded parts. The high-voltage on-board power system is electrically connected to the DC current charging terminal of the charging device during the charging procedure. If the rectifier of the charging device does not have galvanic separation, the high-voltage on-board power system, configured as an IT system, changes into a grounded TT system. This may result, inter alia, in Y capacitances connected in the charging device and/or in the high-voltage on-board power system that are caused, inter alia, by interference suppression capacitors giving rise to stray currents on the protective conductor. These currents are driven by a grid frequency, a switching frequency and by loads connected to the high-voltage on-board power system, and by the harmonics thereof. These stray currents may trigger the residual current or differential current monitoring apparatus in the charging device, which may lead to undesired termination of the charging procedure.

SUMMARY OF THE INVENTION

Described herein is a method for controlling a vehicle-external charging device for charging a vehicle, in particular an electric or hybrid vehicle, wherein the charging device has an AC current grid having a neutral conductor, a protective conductor and at least one phase conductor, a protection and monitoring apparatus and a DC current charging terminal, wherein the vehicle comprises a high-voltage on-board power system and an electrical energy storage element connected to the high-voltage on-board power system, wherein the method comprises the following method steps:

electrically connecting the high-voltage on-board power system to the DC current charging terminal of the charging device, and detecting a protective conductor resistance between the neutral conductor and the protective conductor by feeding in a test current by way of the protection and monitoring apparatus, wherein a frequency of the test current is either outside of a compensation frequency range of the protection and monitoring apparatus or is within the compensation frequency range and is filtered out of the compensation frequency range on a narrow-band basis.

The DC current charging terminal preferably comprises a positive pole and a negative pole. The DC current charging terminal may be configured for example as a CCS terminal in accordance with the IEC 62196 Type 2 standard or as a CHAdeMO terminal.

According to one advantageous refinement of the invention, the method comprises the following further method steps:

detecting a stray current in the protective conductor, feeding in a compensation current, which is complementary to the stray current, in a predetermined frequency range, preferably by way of a capacitively coupled current compensation unit.

In this connection, it has proven to be advantageous if the frequency range is between 5 Hz and 300 kHz, preferably between 25 Hz and 250 kHz.

The stray current in the protective conductor is preferably detected directly or indirectly by way of a measurement current transducer.

According to one advantageous refinement, the compensation current is fed in in real time or quasi-real time. Feeding in of the compensation current in real time or quasi-real time is understood to mean that the compensation current is fed in within the same grid period in which the stray current is detected in the protective conductor.

The method preferably comprises the following further method steps:

disconnecting the electrical connection between the high-voltage on-board power system and the DC current charging terminal, either by tripping a disconnection device of the protection and monitoring apparatus or by feeding in a trip current equal to a differential current in order to trip a protection apparatus installed in the energy supply system.

Also described herein is a charging device for charging a vehicle, in particular an electric or hybrid vehicle, which charging device has an AC current grid having a neutral conductor, a protective conductor and at least one phase conductor, a protection and monitoring apparatus and a DC current charging terminal that is suitable for connection to a high-voltage on-board power system of a vehicle, wherein the charging device is able to be controlled by a method according to the above description.

Using the charging device, it is possible to achieve the same advantages as have already been described in connection with the method according to aspects of the invention.

According to one advantageous refinement of the charging device, the protection and monitoring apparatus has a measurement current transducer that is suitable for directly or indirectly detecting stray current in the protective conductor.

The protection and monitoring apparatus preferably has a loop resistance measurement apparatus that is suitable for detecting a protective conductor resistance between the neutral conductor and the protective conductor.

It is advantageous if the measurement current transducer and the loop resistance measurement apparatus are integrated into a measurement current unit.

According to one advantageous refinement, the charging device has a plurality of rectifier modules connected in parallel, such that an output power of the charging device is able to be set by selecting a suitable number of rectifier modules. In this way, it is in particular possible to achieve a higher power during charging than would be the case using a rectifier arranged in the vehicle.

The rectifier modules are preferably designed as galvanically non-separated rectifier modules, such that the rectifier modules are able to be designed so as to be more compact and lightweight.

BRIEF DESCRIPTION OF THE DRAWING

Further details and advantages of the invention are intended to be explained below with reference to the exemplary embodiments described in the drawings. In the drawings.

DETAILED DESCRIPTION OF THE INVENTION

Figure 1:
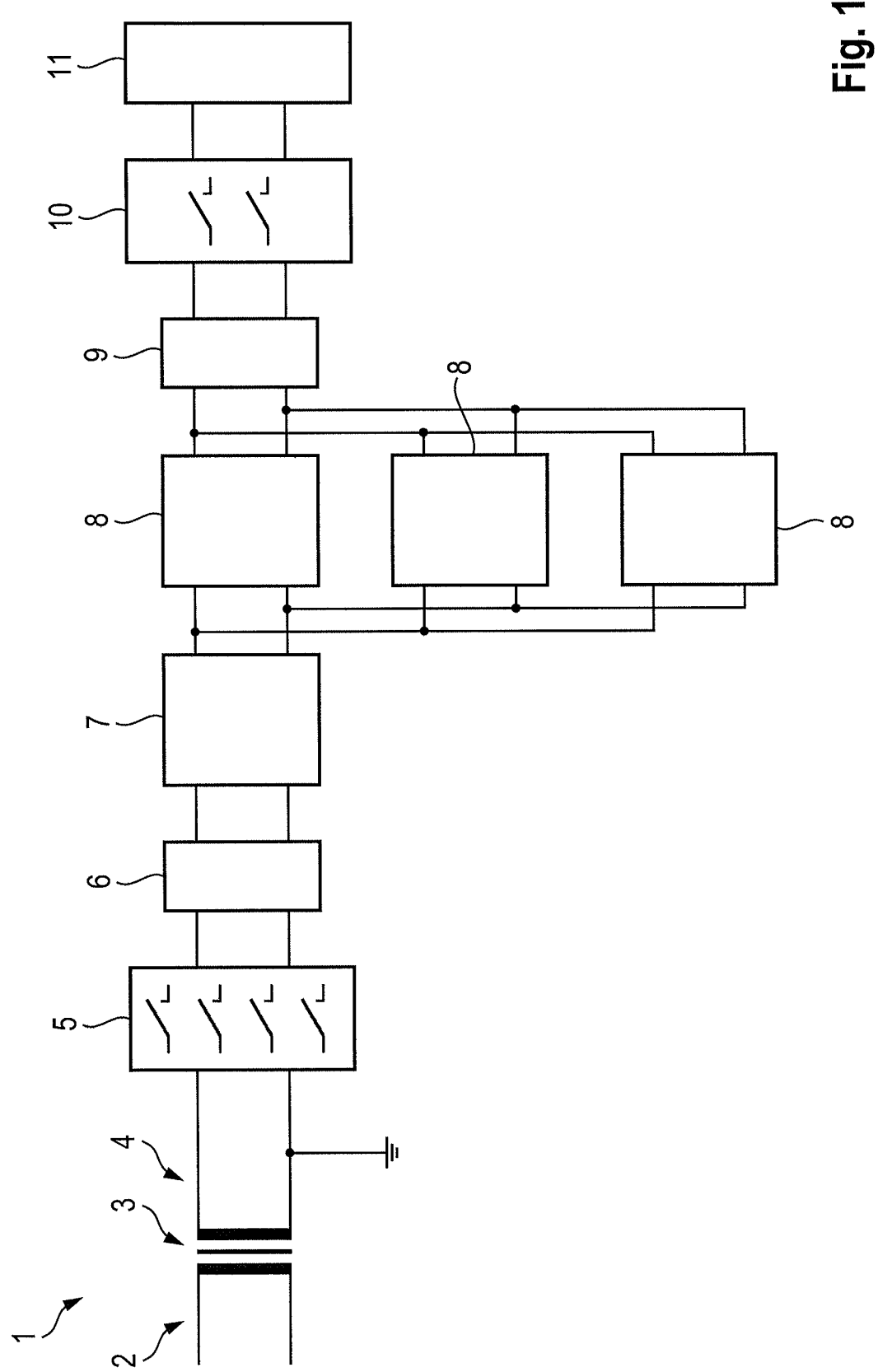
FIG. 1 shows an exemplary embodiment of a charging device according to aspects of the invention in a schematic block diagram.

FIG. 1 shows a charging device 1 for a vehicle, which may be designed as an electric or hybrid vehicle. The charging device 1 comprises an AC current grid 4 designed as a low-voltage grid. The AC current grid 4 is shown only schematically in FIG. 1 and comprises a neutral conductor, a protective conductor and a plurality of phase conductors. According to the exemplary embodiment, the AC current grid 4 is coupled to a further AC voltage grid 2, here a medium-voltage grid, by way of a transformer 3.

The charging device 1 furthermore comprises an input filter 6, which is preferably configured as an EMC filter. A switching device 5, by way of which the input filter 6 is able to be galvanically separated from the transformer 3, is arranged between the transformer 3 and the input filter 6. The switching device 5 may be part of a residual current protection apparatus (RCD).

The charging device 1 furthermore has a plurality of rectifier modules 8 connected in parallel, by way of which an AC voltage from the AC current grid 4 is converted into a DC voltage. The DC voltage is supplied to a DC current charging terminal 11 of the charging device 1. By way of this DC current charging terminal 10, it is possible to connect a high-voltage on-board power system of a vehicle to the charging device 1 in order to charge an electrical energy storage element of the high-voltage on-board power system. The DC current charging terminal 10 comprises at least a positive pole and a negative pole.

An output filter 9, which is configured as an EMC filter, is furthermore arranged between the rectifier modules 8 and the charging terminal 11. A switching device 10, by way of which the rectifiers 8 are selectively able to be connected to the DC current charging terminal 11, is additionally situated between the rectifier modules 8 and the charging terminal 11.

To prevent undesired tripping of the residual current protection apparatus, particular measures have been taken in the case of the charging device 1. The charging device 1 has a protection and monitoring apparatus 7 by way of which a protective conductor resistance between the neutral conductor and the protective conductor is able to be detected. To detect the protective conductor resistance, a test current is fed in by way of the protection and monitoring apparatus, wherein a frequency of the test current is either outside of a compensation frequency range of the protection and monitoring apparatus or within the compensation frequency range and is filtered out of the compensation frequency range on a narrowband basis.

Figure 2:
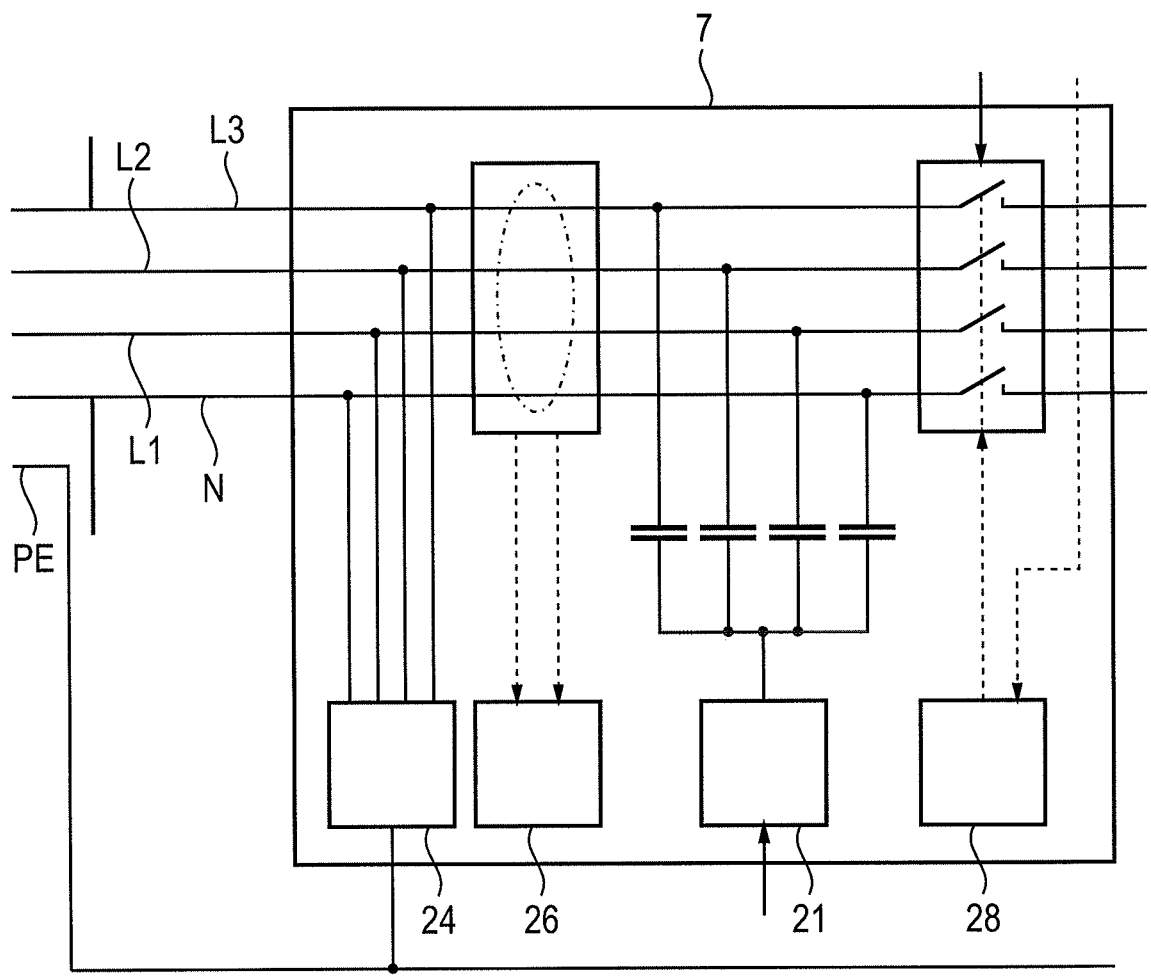
FIG. 2 shows an exemplary embodiment of a protection and monitoring device in a schematic block diagram.

Details on the protection and monitoring apparatus 7 are intended to be explained below with reference to the illustration in FIG. 2. In this case, the phase conductors of the AC current grid 4 are denoted by the reference signs L1, L2, L3, the neutral conductor is denoted by N and the protective conductor is denoted by PE.

The protection and monitoring apparatus 7 comprises a measurement current transducer 26 that is suitable for detecting a stray current arising in the protective conductor PE. The measurement current transducer 26 may be provided with an integrated signal evaluation system. The protection and monitoring apparatus 22 may also comprise a loop resistance measurement apparatus 24, which serves to detect a residual current. In one preferred refinement, the measurement current transducer 26 and the loop resistance measurement apparatus 24 are integrated into a common measurement current unit.

The protection and monitoring apparatus 7 also comprises a current compensation unit 21, which is suitable for feeding in a compensation current, which is complementary to the stray current, in a predetermined frequency range.

The protection and monitoring apparatus 7 optionally comprises a disconnection device 28. The electrical connection between the AC voltage grid 4 and the rectifier modules 8 is able to be disconnected by way of the disconnection device 28.

As an alternative or in addition, the current compensation apparatus 21 may be designed to feed in a trip current for tripping a protection apparatus installed in the charging device 1. In this case, the trip current equals a differential current that normally trips the protection apparatus. As a result, it is possible to achieve additional protection in the case of welded relay contacts, for example.

The charging device 1 shown in FIG. 1 is able to be controlled by way of a method that comprises the following method steps:

electrically connecting the high-voltage on-board power system to the DC current charging terminal 11 of the charging device 1, detecting a protective conductor resistance between the neutral conductor N and the protective conductor PE by feeding in a test current by way of the protection and monitoring apparatus 7, wherein a frequency of the test current is either outside of a compensation frequency range of the protection and monitoring apparatus 7 or within the compensation frequency range and is filtered out of the compensation frequency range on a narrowband basis.

According to one advantageous refinement of the invention, the method comprises the following further method steps:

detecting a stray current in the protective conductor PE, feeding in a compensation current, which is complementary to the stray current, in a predetermined frequency range, preferably by way of a capacitively coupled current compensation unit 21.

In this connection, it has proven to be advantageous if the frequency range is between 5 Hz and 300 kHz, preferably between 25 Hz and 250 kHz.

The stray current in the protective conductor PE is preferably detected directly or indirectly by way of a measurement current transducer 22.

The compensation current is preferably fed in in real time or quasi-real time. Feeding in of the compensation current in real time or quasi-real time is understood to mean that the compensation current is fed in within the same grid period in which the stray current is detected in the protective conductor PE.

The method preferably comprises the following further method step:

disconnecting the electrical connection between the DC current charging terminal 11 and the AC current grid, either by tripping the disconnection device 28 of the protection and monitoring apparatus 7 or by feeding in a trip current equal to a differential current in order to trip a protection apparatus installed in the charging device 1.

The described protection and monitoring apparatus 7 serves, in particular, to compensate the stray current arising from Y capacitances within the charging apparatus 1, said Y capacitances being installed in the high-voltage on-board power system of the vehicle.

The compensation unit 21 is designed to achieve uniform compensation in a given frequency range and not exclusively in the frequencies of specific grid harmonics, as in the case of the compensation units known from the prior art.

Stray currents arising in the high-voltage on-board power system, for example due to high-voltage components, such as, for example, an air-conditioning compressor, are able to be compensated by way of the protection and monitoring apparatus 7.

What is claimed is:

1. A method for controlling a vehicle-external charging device for charging an electric or hybrid vehicle, wherein the charging device has (i) an AC current grid having a neutral conductor (N), a protective conductor (PE) and at least one phase conductor (L1, L2, L3), (ii) a protection and monitoring apparatus, and (iii) a DC current charging terminal, wherein the vehicle comprises a high-voltage on-board power system and an electrical energy storage element connected to the high-voltage on-board power system, wherein the method comprises:

electrically connecting the high-voltage on-board power system to the DC current charging terminal of the charging device, detecting a protective conductor resistance between the neutral conductor (N) and the protective conductor (PE) by feeding in a test current by way of the protection and monitoring apparatus, wherein a frequency of the test current is either outside of a compensation frequency range of the protection and monitoring apparatus or is within the compensation frequency range and is filtered out of the compensation frequency range on a narrowband basis, detecting a stray current in the protective conductor (PE), and feeding in a compensation current, which is complementary to the stray current, in a predetermined frequency range by way of a capacitively coupled current compensation unit.

2. The method as claimed in claim 1, wherein the predetermined frequency range is between 5 Hz and 300 kHz.

3. The method as claimed in claim 1, wherein the stray current is detected directly or indirectly in the protective conductor (PE) by way of a measurement current transducer.

4. The method as claimed in claim 1, wherein the compensation current is fed-in in either real time or quasi-real time.

5. The method as claimed in claim 1 further comprising disconnecting the electrical connection between the DC current charging terminal and the AC current grid, either by tripping a disconnection device of the protection and monitoring apparatus or by feeding in a trip current equal to a differential current in order to trip a protection apparatus installed in the charging device.

6. A vehicle-external charging device for charging an electric or hybrid vehicle, which charging device comprises (i) an AC current grid having a neutral conductor, a protective conductor and at least one phase conductor, (ii) a protection and monitoring apparatus, and (iii) a DC current charging terminal configured for connection to a high-voltage on-board power system of the vehicle, wherein the charging device is configured to detect a protective conductor resistance between the neutral conductor (N) and the protective conductor (PE) by feeding in a test current by way of the protection and monitoring apparatus, wherein a frequency of the test current is either outside of a compensation frequency range of the protection and monitoring apparatus or is within the compensation frequency range and is filtered out of the compensation frequency range on a narrowband basis, and wherein the protection and monitoring apparatus comprises a measurement current transducer configured for directly or indirectly stray current in the protective conductor (PE).

7. The vehicle-external charging device as claimed in claim 6, wherein the protection and monitoring apparatus comprises a loop resistance measurement apparatus configured for detecting a protective conductor resistance between the neutral conductor (N) and the protective conductor (PE).

8. The vehicle-external charging device as claimed claim 7, wherein the measurement current transducer and the loop resistance measurement apparatus are integrated into a measurement current unit.

9. The vehicle-external charging device as claimed in claim 6, comprising a plurality of rectifier modules connected in parallel.

* * * * *